United States Patent [19]

Kumar et al.

[11] Patent Number: 5,168,439
[45] Date of Patent: Dec. 1, 1992

[54] INVERTER CONTROL METHOD AND APPARATUS

[75] Inventors: Ajith Kumar; Thomas D. Stitt, both of Erie, Pa.

[73] Assignee: General Electric Company, Erie, Pa.

[21] Appl. No.: 618,787

[22] Filed: Nov. 27, 1990

[51] Int. Cl.⁵ .......................................... H02M 7/44
[52] U.S. Cl. ...................................... 363/95; 363/41; 318/811; 364/480
[58] Field of Search ............................ 363/95, 41, 97; 318/811; 364/480, 481, 482, 483, 484, 485, 486; 323/283, 241

[56] References Cited

U.S. PATENT DOCUMENTS

| | | | |
|---|---|---|---|
| 4,047,083 | 9/1977 | Plunkett | 363/41 |
| 4,105,939 | 8/1978 | Culbertson | 318/599 |
| 4,513,362 | 4/1985 | Aizawa | 363/41 |
| 4,587,605 | 5/1986 | Kouyama et al. | 363/41 |
| 4,698,744 | 10/1987 | Itani | 363/41 |
| 4,771,224 | 9/1988 | Elms | 318/809 |
| 4,870,556 | 9/1989 | Inaba et al. | 363/41 |
| 4,924,373 | 5/1990 | Inaba et al. | 363/91 |

OTHER PUBLICATIONS

Control of Electrical Drives—W. Leonhard—1985 All.

Primary Examiner—Steven L. Stephan
Assistant Examiner—Adolf Berhane
Attorney, Agent, or Firm—R. Thomas Payne

[57] ABSTRACT

A method and apparatus for controlling an inverter circuit to convert dc voltage to variable amplitude and frequency ac voltage use firing pattern tables which are stored and selected in accordance with a required voltage level for the ac voltage. The firing pattern tables are accessed by writable timers which both address the firing pattern tables and define the times between readout of consecutive entires of the firing pattern tables. If requirements of the ac voltage being produced are changed, a new firing pattern table is selected at the end of the currently selected pattern table. Further, as the required frequency of the ac voltage being produced changes during the readout of a selected firing pattern table, the times written into the writable timers are changed accordingly to vary the frequency of the ac signal on the fly. Angle tables corresponding to the pattern tables are stored and accessed by a control processor to determine the times written into the timers. The angle tables are stored in terms of angles between transitions of the pattern tables and one or more angle tables are provided for each pattern table. The amplitude of the ac voltage being produced is determined by pattern table selection and angle table section, if more than one angle table is provided for a given pattern table, and the frequency of the ac voltage being produced is determined by the time signals generated by the processor.

18 Claims, 14 Drawing Sheets

| PERCENT | FORWARD PATTERN TABLE | ANGLE TABLE | REVERSE PATTERN TABLE |
|---|---|---|---|
| 200 | PTAB1000F | TABLE 0 | PTAB1000R |
| 100 | P1000F_30 | TABLE 1a | P1000R_30 |
| 98.5 | PTAB0970F | TABLE 1b | PTAB0970R |
| 96.0 | PTAB0970F | TABLE 1c | PTAB0970R |
| 93.5 | PTAB0970F | TABLE 11 | PTAB0970R |
| 91.5 | PTAB0970F | TABLE 12 | PTAB0970R |
| 88.5 | PTAB0970F | TABLE 13 | PTAB0970R |
| 85.5 | PTAB0970F | TABLE 14 | PTAB0970R |
| 82.5 | PTABH_9XF | TABLE 15 | PTABL_9XR |

```
PTAB1000F            000H
                     LABEL           BYTE
         DB   00100101B       ;0
         DB   01100001B       ;60
         DB   10100011B       ;120
         DB   00000010B       ;180
         DB   01000110B       ;240 TABLE CHANGE
         DB   10000100B       ;300, TABLE END
         DB   00100101B       ;0
         DB   01100001B       ;60
         DB   10100011B       ;120
         DB   00000010B       ;180
         DB   01000110B       ;240 TABLE CHANGE
         DB   10010100B       ;300, TABLE END
```

FIG. 3

```
;B AND C INTERCHANGED
PTAB1000R            LABEL           BYTE
         DB   00100011B       ;0
         DB   01100001B       ;60
         DB   10100101B       ;120
         DB   00000100B       ;180
         DB   01000110B       ;240 TABLE CHANGE
         DB   10000010B       ;300, TABLE END
         DB   00100011B       ;0
         DB   01100001B       ;60
         DB   10100101B       ;120
         DB   00000100B       ;180
         DB   01000110B       ;240 TABLE CHANGE
         DB   10010010B       ;300, TABLE END
```

FIG 4

```
P1000F_30            LABEL           BYTE
         DB   00100101B       ;0
         DB   01100101B       ;30
         DB   10100001B       ;60
         DB   00000001B       ;90
         DB   01000011B       ;120
         DB   10000011B       ;150
         DB   00100010B       ;180
         DB   01100010B       ;210
         DB   10100110B       ;240
         DB   00000110B       ;270
         DB   01000100B       ;300
         DB   10010100B       ;330, TABLE END
```

FIG. 5

;B AND C INTERCHANGED:
P1000R_30           LABEL           BYTE
        DB      00100011B       ;0
        DB      01100011B       ;30
        DB      10100001B       ;60
        DB      00000001B       ;90
        DB      01000101B       ;120
        DB      10000101B       ;150
        DB      00100100B       ;180
        DB      01100100B       ;210
        DB      10100110B       ;240
        DB      00000110B       ;270
        DB      01000010B       ;300
        DB      10010010B       ;330, TABLE END
PULSE_PROM  ENDS
            END

FIG_6

PTAB0970F
        DB      00100101B       ;0
        DB      01100100B       ;15.9
        DB      10100101B       ;19.3
        DB      00000001B       ;40.7
        DB      01000101B       ;44.1
        DB      10000001B       ;60
        DB      00100101B       ;75.9
        DB      01100001B       ;79.3
        DB      10100011B       ;100.7
        DB      00000001B       ;104.1
        DB      01000011B       ;120
        DB      10000001B       ;135.9
        DB      00100011B       ;139.3
        DB      01100010B       ;160.7
        DB      10100011B       ;164.1
        DB      00000010B       ;180
        DB      01000011B       ;195
        DB      10000010B       ;199.3
        DB      00100110B       ;220.7
        DB      01100010B       ;224.1
        DB      10100110B       ;240
        DB      00000010B       ;255.9
        DB      01000110B       ;259.3
        DB      10000100B       ;280.7
        DB      00100110B       ;284.1
        DB      01100100B       ;300
        DB      10100110B       ;315.9
        DB      00000100B       ;319.3
        DB      01000101B       ;340.7 TABLE CHANGE
        DB      10010100B       ;344.1, TABLE END

FIG_7

```
PTAB0970R              LABEL        BYTE
        DB  00100011B          ;0
        DB  01100010B          ;15.9
        DB  10100011B          ;19.3
        DB  00000001B          ;40.7
        DB  01000011B          ;44.1
        DB  10000001B          ;60
        DB  00100011B          ;75.9
        DB  01100001B          ;79.3
        DB  10100101B          ;100.7
        DB  00000001B          ;104.1
        DB  01000101B          ;120
        DB  10000001B          ;135.9
        DB  00100101B          ;139.3
        DB  01100100B          ;160.7
        DB  10100101B          ;164.1
        DB  00000100B          ;180
        DB  01000101B          ;195
        DB  10000100B          ;199.3
        DB  00100110B          ;220.7
        DB  01100100B          ;224.1
        DB  10100110B          ;240
        DB  00000100B          ;255.9
        DB  01000110B          ;259.3
        DB  10000010B          ;280.7
        DB  00100110B          ;284.1
        DB  01100010B          ;300
        DB  10100110B          ;315.9
        DB  00000010B          ;319.3
        DB  01000011B          ;340.7 TABLE CHANGE
        DB  10010010B          ;344.1, TABLE END
```

FIG. 8

```
PTABH_9XF      LABEL          BYTE
        DB     00100101B      ; 0
        DB     01100100B      ;
        DB     10100000B      ;
        DB     00000001B      ;
        DB     01000101B      ;
        DB     10000001B      ; 60
        DB     00100101B      ;
        DB     01100111B      ;
        DB     10100011B      ;
        DB     00000001B      ;
        DB     01000011B      ; 120
        DB     10000001B      ;
        DB     00100000B      ;
        DB     01100010B      ;
        DB     10100011B      ;
        DB     00000010B      ; 180
        DB     01000011B      ;
        DB     10000111B      ;
        DB     00100110B      ;
        DB     01100010B      ;
        DB     10100110B      ; 240
        DB     00000010B      ;
        DB     01000000B      ;
        DB     10000100B      ;
        DB     00100110B      ;
        DB     01100100B      ; 300
        DB     10100110B      ;
        DB     00000111B      ;
        DB     01000101B      ; TABLE CHANGE
        DB     10010100B      ; TABLE END
```

FIG. 9

```
PTABH_9XR    LABEL        BYTE
    DB    00100011B    ; 0
    DB    01100010B    ;
    DB    10100000B    ;
    DB    00000001B    ;
    DB    01000011B    ;
    DB    10000001B    ; 60
    DB    00100011B    ;
    DB    01100111B    ;
    DB    10100101B    ;
    DB    00000001B    ;
    DB    01000101B    ; 120
    DB    10000001B    ;
    DB    00100000B    ;
    DB    01100100B    ;
    DB    10100101B    ;
    DB    00000100B    ; 180
    DB    01000101B    ;
    DB    10000111B    ;
    DB    00100110B    ;
    DB    01100100B    ;
    DB    10100110B    ; 240
    DB    00000100B    ;
    DB    01000000B    ;
    DB    10000010B    ;
    DB    00100110B    ;
    DB    01100010B    ; 300
    DB    10100110B    ;
    DB    00000111B    ;
    DB    01000011B    ; TABLE CHANGE
    DB    10010010B    ; TABLE END
          FIG.10

;TABLE 0
PTAB1000F_SIZE  DW  (4+12*2)*2 ; SIZE OF TABLE=(4(SIZE+LIMIT+OFFSET(2))+
                               ; 6*2 (#OF ELEMENTS IN TABLE)}*
                               ; 2 (BYTES)
                DW  685        ; MINIMUM FREQUNCY= 1.5+
                               ; (HIGHEST#/65536) +
                DW  0000H      ; OFFSET IN PROM LOOKUP FOR
                               ; FOWARD DIRECTION
                DW  000CH      ; OFFSET IN PROM LOOKUP FOR
                               ; REVERSE DIRECTION
                DD  44739243   ;   0 TO= 60
                DD  44739243   ;  60 TO= 60
                DD  44739243   ; 120 TO= 60
                DD  44739243   ; 180 TO= 60
                DD  44739243   ; 240 TO= 60
                DD  44739243   ; 300 TO= 60
                DD  44739243   ; 360 TO= 60
                DD  44739243   ; 420 TO= 60
                DD  44739243   ; 480 TO= 60
                DD  44739243   ; 540 TO= 60
                DD  44739243   ; 600 TO= 60
                DD  44739243   ; 660 TO= 60
                        FIG.11
```

```
;TABLE Id
P1000F_30_SIZE  DW  (4+12*2)*2 ;SIZE OF TABLE={4(SIZE+LIMIT+
                              ; OFFSET(2))+6*2(#OF ELEMENTS IN
                              ; TABLE)}*2 (BYTES)
                DW  343       ; MINIMUM FREQUNCY=1.5+
                              ; (HIGHEST #/65536) +
                DW  05CCH     ; OFFSET IN PROM LOOKUP FOR
                              ; FORWARD DIRECTION
                DW  05D8H     ; OFFSET IN PROM LOOKUP FOR
                              ; REVERSE DIRECTION
                DD  22369621;     0 TO = 30
                DD  22369621;    30 TO = 30
                DD  22369621;    60 TO = 30
                DD  22369621;    90 TO = 30
                DD  22369621;   120 TO = 30
                DD  22369621;   150 TO = 30
                DD  22369621;   180 TO = 30
                DD  22369621;   210 TO = 30
                DD  22369621;   240 TO = 30
                DD  22369621;   270 TO = 30
                DD  22369621;   300 TO = 30
                DD  22369621;   330 TO = 30
```

FIG. 12

```
;TABLE 1b
POPTx985F_SIZE  DW  (4+30*2)*2
                DW  523         ; MINIMUM FREQUNCY= 1.5+
                                ; (HIGHEST*/65536)+
                DW  0018H       ; OFFSET IN PROM LOOKUP FOR
                                ; FORWARD DIRECTION
                DW  0036H       ; OFFSET IN PROM LOOKUP FOR
                                ; REVERSE DIRECTION
                DD    820219 ;     0   TO = 1.1
                DD   4473922 ;     1.1 TO = 6.0
                DD  34150972 ;     7.1 TO = 45.8
                DD   4473922 ;    52.9 TO = 6.0
                DD    820219 ;    58.9 TO = 1.1
                DD    820219 ;    60.0 TO = 1.1
                DD   4473922 ;    61.1 TO = 6.0
                DD  34150972 ;    67.1 TO = 45.8
                DD   4473922 ;   112.9 TO = 6.0
                DD    820219 ;   118.9 TO = 1.1
                DD    820219 ;   120.0 TO = 1.1
                DD   4473922 ;   121.1 TO = 6.0
                DD  34150972 ;   127.1 TO = 45.8
                DD   4473922 ;   172.9 TO = 6.0
                DD    820219 ;   178.9 TO = 1.1
                DD    820219 ;   180.0 TO = 1.1
                DD   4473922 ;   181.1 TO = 6.0
                DD  34150972 ;   187.1 TO = 45.8
                DD   4473922 ;   232.9 TO = 6.0
                DD    820219 ;   238.9 TO = 1.1
                DD    820219 ;   240.0 TO = 1.1
                DD   4473922 ;   241.1 TO = 6.0
                DD  34150972 ;   247.1 TO = 45.8
                DD   4473922 ;   292.9 TO = 6.0
                DD    820219 ;   298.8 TO = 1.1
                DD    820219 ;   300.0 TO = 1.1
                DD   4473922 ;   301.1 TO = 6.0
                DD  34150972 ;   307.1 TO = 45.8
                DD   4473922 ;   352.9 TO = 6.0
                DD    820219 ;   358.9 TO = 1.1
```

FIG. 13

```
;TABLE 1c
POPT0960F SIZE  DW  (4+30*2)*2
                DW  316        ; MINIMUM FREQUNCY = 1.5 +
                               ; (HIGHEST*/65536) +
                DW  0018H      ; OFFSET IN PROM LOOKUP FOR
                               ; FORWARD DIRECTION
                DW  0036H      ; OFFSET IN PROM LOOKUP FOR
                               ; REVERSE DIRECTION
                DD   8500456 ;   0.0 TO= 11.4
                DD   3579139 ;  11.4 TO=  4.8
                DD  20580052 ;  16.2 TO= 27.6
                DD   3579139 ;  43.8 TO=  4.8
                DD   8500456 ;  48.6 TO= 11.4
                DD   8500456 ;  60.0 TO= 11.4
                DD   3579139 ;  71.4 TO=  4.8
                DD  20580052 ;  76.2 TO= 27.6
                DD   3579139 ; 103.8 TO=  4.8
                DD   8500456 ; 108.6 TO= 11.4
                DD   8500456 ; 120.0 TO= 11.4
                DD   3579139 ; 131.4 TO=  4.8
                DD  20580052 ; 136.2 TO= 27.6
                DD   3579139 ; 163.8 TO=  4.8
                DD   8500456 ; 168.6 TO= 11.4
                DD   8500456 ; 180.0 TO= 11.4
                DD   3579139 ; 191.4 TO=  4.8
                DD  20580052 ; 196.2 TO= 27.6
                DD   3579139 ; 223.8 TO=  4.8
                DD   8500456 ; 228.6 TO= 11.4
                DD   8500456 ; 240.0 TO= 11.4
                DD   3579139 ; 251.4 TO=  4.8
                DD  20580052 ; 256.2 TO= 27.6
                DD   3579139 ; 283.8 TO=  4.8
                DD   8500456 ; 288.6 TO= 11.4
                DD   8500456 ; 300.0 TO= 11.4
                DD   3579139 ; 311.4 TO=  4.8
                DD  20580052 ; 316.2 TO= 27.6
                DD   3579139 ; 343.8 TO=  4.8
                DD   8500456 ; 348.6 TO= 11.4
```

FIG. 14

```
;TABLE 11
POPT0935F_SIZE  DW  (4+30*2)*2
                DW  189        ; MINIMUM FREQUNCY = 1.5 +
                               ; (HIGHEST*/65536) +
                DW  0018H      ; OFFSET IN PROM LOOKUP FOR
                               ; FOWARD DIRECTION
                DW  0036H      ; OFFSET IN PROM LOOKUP FOR
                               ; REVERSE DIRECTION
                ;
                DD  12005030 ;   0    TO = 16.1
                DD   4250228 ;  16.1  TO = 5.7
                DD  12228726 ;  21.8  TO = 16.4
                DD   4250228 ;  38.2  TO = 5.7
                DD  12005030 ;  43.9  TO = 16.1
                DD  12005030 ;  60.0  TO = 16.1
                DD   4250228 ;  76.1  TO = 5.7
                DD  12228726 ;  81.8  TO = 16.4
                DD   4250228 ;  98.2  TO = 5.7
                DD  12005030 ; 103.9  TO = 16.1
                DD  12005030 ; 120    TO = 16.1
                DD   4250228 ; 136.1  TO = 5.7
                DD  12228726 ; 141.8  TO = 16.4
                DD   4250228 ; 158.2  TO = 5.7
                DD  12005030 ; 163.9  TO = 16.1
                DD  12005030 ; 180    TO = 16.1
                DD   4250228 ; 196.1  TO = 5.7
                DD  12228726 ; 201.8  TO = 16.4
                DD   4250228 ; 218.2  TO = 5.7
                DD  12005030 ; 223.9  TO = 16.1
                DD  12005030 ; 240    TO = 16.1
                DD   4250228 ; 256.1  TO = 5.7
                DD  12228726 ; 261.8  TO = 16.4
                DD   4250228 ; 278.2  TO = 5.7
                DD  12005030 ; 283.9  TO = 16.1
                DD  12005030 ; 300    TO = 16.1
                DD   4250228 ; 316.1  TO = 5.7
                DD  12228726 ; 321.8  TO = 16.4
                DD   4250228 ; 338.2  TO = 5.7
                DD  12005030 ; 343.9  TO = 16.1
```

FIG_15

```
; TABLE 12
POPT0915F_SIZE  DW  (4+30*2)*2
                DW  202       ; MINIMUM FREQUNCY = 1.5 +
                              ;  (HIGHEST*/65536) +
                DW  0018H     ; OFFSET IN PROM LOOKUP FOR
                              ; FORWARD DIRECTION
                DW  0036H     ; OFFSET IN PROM LOOKUP FOR
                              ; REVERSE DIRECTION
                DD  13123511  ;    0    TO   17.6
                DD   5070448  ;   17.6  TO    6.8
                DD   8351325  ;   24.4  TO   11.2
                DD   5070448  ;   35.6  TO    6.8
                DD  13123511  ;   42.4  TO   17.6
                DD  13123511  ;   60.0  TO   17.6
                DD   5070448  ;   77.6  TO    6.8
                DD   8351325  ;   84.4  TO   11.2
                DD   5070448  ;   95.6  TO    6.8
                DD  13123511  ;  102.4  TO   17.6
                DD  13123511  ;  120    TO   17.6
                DD   5070448  ;  137.6  TO    6.8
                DD   8351325  ;  144.4  TO   11.2
                DD   5070448  ;  155.6  TO    6.8
                DD  13123511  ;  162.4  TO   17.6
                DD  13123511  ;  180    TO   17.6
                DD   5070448  ;  197.6  TO    6.8
                DD   8351325  ;  204.4  TO   11.2
                DD   5070448  ;  215.6  TO    6.8
                DD  13123511  ;  222.4  TO   17.6
                DD  13123511  ;  240    TO   17.6
                DD   5070448  ;  257.6  TO    6.8
                DD   8351325  ;  264.4  TO   11.2
                DD   5070448  ;  275.6  TO    6.8
                DD  13123511  ;  282.4  TO   17.6
                DD  13123511  ;  300    TO   17.6
                DD   5070448  ;  317.6  TO    6.8
                DD   8351325  ;  324.4  TO   11.2
                DD   5070448  ;  335.6  TO    6.8
                DD  13123511  ;  342.4  TO   17.6
```

FIG. 16

```
;TABLE 13
POPT085F_SIZE  DW  (4+30*2)*2
               DW  210        ; MINIMUM FREQUNCY=1.5 +
                              ; (HIGHEST#/65536)+
               DW  0018H      ; OFFSET IN PROM LOOKUP FOR
                              ; FORWARD DIRECTION
               DW  0036H      ; OFFSET IN PROM LOOKUP FOR
                              ; REVERSE DIRECTION
               DD  13645469 ;   0    TO = 18.3
               DD   6412625 ;  18.3  TO =  8.6
               DD   4623055 ;  26.9  TO =  6.2
               DD   6412625 ;  33.1  TO =  8.6
               DD  13645469 ;  41.7  TO = 18.3
               DD  13645469 ;  60.0  TO = 18.3
               DD   6412625 ;  78.3  TO =  8.6
               DD   4623055 ;  86.9  TO =  6.2
               DD   6412625 ;  93.1  TO =  8.6
               DD  13645469 ; 101.7  TO = 18.3
               DD  13645469 ; 120    TO = 18.3
               DD   6412625 ; 138.3  TO =  8.6
               DD   4623055 ; 146.9  TO =  6.2
               DD   6412625 ; 153.1  TO =  8.6
               DD  13645469 ; 161.7  TO = 18.3
               DD  13645469 ; 180    TO = 18.3
               DD   6412625 ; 198.3  TO =  8.6
               DD   4623055 ; 206.9  TO =  6.2
               DD   6412625 ; 213.1  TO =  8.6
               DD  13645469 ; 221.7  TO = 18.3
               DD  13645469 ; 240    TO = 18.3
               DD   6412625 ; 258.3  TO =  8.6
               DD   4623055 ; 266.9  TO =  6.2
               DD   6412625 ; 273.1  TO =  8.6
               DD  13645469 ; 281.7  TO = 18.3
               DD  13645469 ; 300    TO = 18.3
               DD   6412625 ; 318.3  TO =  8.6
               DD   4623055 ; 326.9  TO =  6.2
               DD   6412625 ; 333.1  TO =  8.6
               DD  13645469 ; 341.7  TO = 18.3
```

FIG. 17

```
;TABLE 14
POPTO855F_SIZE  DW (4+30*2)*2
                DW 215        ; MINIMUM FREQUNCY = 1.5 +
                              ; (HIGHEST*/65536)+
                DW 0018H      ; OFFSET IN PROM LOOKUP FOR
                              ; FORWARD DIRECTION
                DW 0036H      ; OFFSET IN PROM LOOKUP FOR
                              ; REVERSE DIRECTION
                DD 13943731 ;    0      TO = 18.7
                DD  7680237 ;   18.7    TO = 10.3
                DD  1491308 ;   29.0    TO = 2.0
                DD  7680237 ;   31.0    TO = 10.3
                DD 13943731 ;   41.3    TO = 18.7
                DD 13943731 ;   60.0    TO = 18.7
                DD  7680237 ;   78.7    TO = 10.3
                DD  1491308 ;   89.0    TO = 2.0
                DD  7680237 ;   91.0    TO = 10.3
                DD 13943731 ;  101.3    TO = 18.7
                DD 13943731 ;  120      TO = 18.7
                DD  7680237 ;  138.7    TO = 10.3
                DD  1491308 ;  149.0    TO = 2.0
                DD  7680237 ;  151.0    TO = 10.3
                DD 13943731 ;  161.3    TO = 18.7
                DD 13943731 ;  180      TO = 18.7
                DD  7680237 ;  198.7    TO = 10.3
                DD  1491308 ;  209.0    TO = 2.0
                DD  7680237 ;  211.0    TO = 10.3
                DD 13943731 ;  221.3    TO = 18.7
                DD 13943731 ;  240      TO = 18.7
                DD  7680237 ;  258.7    TO = 10.3
                DD  1491308 ;  269.0    TO = 2.0
                DD  7680237 ;  271.0    TO = 10.3
                DD 13943731 ;  281.3    TO = 18.7
                DD 13943731 ;  300      TO = 18.7
                DD  7680237 ;  318.7    TO = 10.3
                DD  1491308 ;  329.0    TO = 2.0
                DD  7680237 ;  331.0    TO = 10.3
                DD 13943731 ;  341.3    TO = 18.7
```

FIG_18

```
;TABLE 15
POPTO825F_SIZE  DW  (4+30*2)2
                DW  212      ; MINIMUM FREQUNCY = 1.5 +
                             ; (HIGHEST*/65536) +
                DW  04B4H    ; OFFSET IN PROM LOOKUP FOR
                             ; FORWARD DIRECTION
                DW  04D2H    ; OFFSET IN PROM LOOKUP FOR
                             ; REVERSE DIRECTION
                DD  13794600 ;   0    TO = 18.5
                DD   8127629 ;  18.5  TO = 10.9
                DD    894785 ;  29.4  TO = 1.2
                DD   8127629 ;  30.6  TO = 10.9
                DD  13794600 ;  41.5  TO = 18.5
                DD  13794600 ;  60.0  TO = 18.5
                DD   8127629 ;  78.5  TO = 10.9
                DD    894785 ;  89.4  TO = 1.2
                DD   8127629 ;  90.6  TO = 10.9
                DD  13794600 ; 101.5  TO = 18.5
                DD  13794600 ; 120    TO = 18.5
                DD   8127629 ; 138.5  TO = 10.9
                DD    894785 ; 149.4  TO = 1.2
                DD   8127629 ; 150.6  TO = 10.9
                DD  13794600 ; 161.5  TO = 18.5
                DD  13794600 ; 180    TO = 18.5
                DD   8127629 ; 198.5  TO = 10.9
                DD    894785 ; 209.4  TO = 1.2
                DD   8127629 ; 210.6  TO = 10.9
                DD  13794600 ; 221.5  TO = 18.5
                DD  13794600 ; 240    TO = 18.5
                DD   8127629 ; 258.5  TO = 10.9
                DD    894785 ; 269.4  TO = 1.2
                DD   8127629 ; 270.6  TO = 10.9
                DD  13794600 ; 281.5  TO = 18.5
                DD  13794600 ; 300    TO = 18.5
                DD   8127629 ; 318.5  TO = 10.9
                DD    894785 ; 329.4  TO = 1.2
                DD   8127629 ; 330.6  TO = 10.9
                DD  13794600 ; 341.5  TO = 18.5
```

FIG. 19

INVERTER CONTROL METHOD AND APPARATUS

BACKGROUND OF THE INVENTION

The present invention relates generally to inverter circuits for converting dc voltage to ac voltage and, more particularly, to a control circuit for generating drive signals for an inverter circuit for converting dc voltage to three phase variable amplitude and frequency ac voltage. While the invention of the present application is generally applicable to such power conversion, it is particularly applicable to a controller for driving adjustable ac motors for example as used in applications such as traction drives for electrically propelled rail vehicles.

Typically in the conversion of dc voltage to ac voltage, an ac or sine wave reference signal is compared with a higher frequency triangular wave to create a pulse width modulation (PWM) signal proportional to the reference signal. The resulting PWM signal is used to drive a power switching inverter which converts dc voltage into ac voltage and is normally constructed of unidirectional conducting switching elements such as power transistors, thyristors, gate turn off (GTO) devices or the like. The PWM mode of operation must ultimately give way to a square wave mode of operation to obtain the maximum possible output voltage from any conversion arrangement. Unfortunately, a problem is encountered in the transition between, triangle interception PWM and unmodulated square wave modes of operation.

A number of attempts have been made to solve this problem. One proposed solution is to provide a series of transitional PWM modes of operation wherein the timing waveform is synchronized to the reference signal, its frequency or slope is variously modified, and/or the amplitude of the reference signal is varied as necessary to reduce the number of "chops" or transitions of the signal which constructs the ac voltage to zero without discontinuity in the amplitude of the fundamental output waveform.

Another proposed solution is disclosed in U.S. Pat. No. 4,047,083 wherein a control arrangement is made up of three modes of operation: the first mode is a triangle interception PWM operating mode which is used as long as an amplitude control signal does not exceed a predetermined reference value and the speed of a controlled motor does not exceed a predetermined reference speed; the second operating mode is a dual dc level set transition mode in which the lower level is varied as a function of the higher level so as to minimize selected harmonics of the ac voltage and the higher level is varied as a function of the amplitude command signal to vary the amplitude of the fundamental voltage component; and the third operating mode is a square wave mode. Transition from the second mode to the third mode is performed by transition means forming a part of the patented invention. For additional information regarding these prior art control arrangements, reference should be made to U.S. Pat. No. 4,047,083 which is incorporated herein by reference.

While the control arrangement of the referenced U.S. patent provides a substantial improvement over prior existing and proposed arrangements, there remains a need for an improved simplified control arrangement for generating drive signals for an inverter circuit for converting dc voltage to three phase variable amplitude and frequency ac voltage which is inexpensive, versatile and adaptable to the requirements of specific applications. Such improved arrangements not only advance the art but also provide attractive alternatives thereto while improving the performance of systems incorporating them.

SUMMARY OF THE INVENTION

This need is met by the method and apparatus of the present invention wherein firing pattern tables are stored and selected in accordance with a required voltage level to control an inverter circuit to convert dc voltage to variable amplitude and frequency ac voltage. The firing pattern tables are accessed by writable timer means which address and define the times between readout of consecutive entries of the firing pattern tables. If requirements of the ac voltage being produced are changed, a new firing pattern table is selected at the end of or at an appropriate time within the currently selected pattern table. Further, as the required frequency of the ac voltage being produced changes during the readout of a selected firing pattern table, the times written into the writable timer means are changed accordingly to vary the frequency of the ac signal on the fly. While determination of the times to be written into the writable timer means may be made in a variety of ways, preferably angle tables corresponding to the pattern tables are stored and accessed by processor means to determine the times. The angle tables are stored in terms of angles, degrees or radians, between transitions of the pattern tables and one or more angle tables are provided for each pattern table. Thus, the amplitude of the ac voltage being produced is determined by pattern table selection and angle table selection if more than one angle table is provided for a given pattern table, and the frequency of the ac voltage being produced is determined by the time signals generated by the processor means.

In carrying out invention in one form, a control circuit for generating drive signals for an inverter circuit for converting dc voltage to three phase variable amplitude and frequency ac voltage comprises memory means for storing firing pattern signals defining on/off status of switching devices making up the inverter circuit. Writable timing circuit means is provided to address the memory means and thereby read the firing pattern signals from the memory means. Processor means write times into the writable timing circuit means for controlling the voltage level and frequency of the three phase ac voltage generated by the inverter.

In the preferred embodiment, the firing pattern signals are stored in firing pattern tables and the processor means further provides for selecting among the pattern tables. The processor means further comprises angle table storage means for storing angle tables defining transition times for sequencing between consecutively read ones of the firing pattern signals within corresponding firing signal pattern tables. The transition times are stored in terms of pulse width angles of the transition times and the processor means uses the angle tables to determine times, written into the writable timing circuit means dependent upon the desired frequency of the ac voltage being generated. At least one angle table is provided for each pattern table.

In accordance with another aspect of the present invention, a control circuit for generating drive signals for an inverter circuit which converts dc voltage to three phase variable amplitude and frequency ac voltage comprises first memory means for storing firing pattern tables including inverter control signals defining on/off status of switching devices making up the inverter circuit. Writable timing circuit means are provided for addressing the first memory means to read the firing pattern tables stored within the first memory means in accordance with times written into the writable timing circuit means. Processor means select pattern tables within the first memory means in response to a desired or required voltage level for the three phase ac voltage generated by the inverter and write times into the writable timing circuit means in response to a desired or required frequency for the three phase ac voltage generated by the inverter.

Preferred embodiments further comprise interrupt controller means interconnected between the writable timing circuit means and the processor means for generating interrupts of the processor means upon time outs of the writable timer means. The interrupt means permits the processor means to maintain a defined portion, up to six (6) milliseconds in the preferred embodiment, of the times written ahead into the writable timing means. The processor means comprises second memory means for storing angle tables defining transition times of the inverter control signals in terms of pulse width angles for the transition times, and the processor means uses the angle tables for determining times written into the writable timing circuit means.

Yet another aspect of our invention, a method for generating drive signals for an inverter circuit for converting dc voltage to three phase variable amplitude and frequency ac voltage comprises the steps of: storing firing pattern signals defining on/off status of switching devices making up the inverter circuit; reading the firing pattern signals in accordance with writable read times to access the firing pattern signals for control of the inverter circuit; and, writing the read times to control the voltage level and frequency of the three phase ac voltage generated by the inverter. The read times may be written into a writable timing circuit. The step of storing firing pattern signals may comprise storing tables of firing pattern signals corresponding to voltage levels or voltage level ranges of the three phase ac voltage to be generated by the inverter circuit with the method further comprising selecting among the tables as a function of the three phase ac voltage to be generated by the inverter.

To facilitate determination of the times to be written in the method of the present invention, the method may further comprise the step of storing angle tables defining transition times for sequencing between consecutively read ones of the firing pattern signals within corresponding firing signal pattern tables, the transition times being stored in terms of pulse width angles of the transition times. The method then further comprises the step of determining the read times in accordance with the angle tables. At least one angle table is provided for each pattern table and the method may further comprise the step of selecting an angle table to define the voltage level of the three phase ac voltage.

It is thus an object of the present invention to provide an improved, inexpensive and adaptable method and apparatus for generating drive signals for an inverter circuit for converting dc voltage to three phase variable amplitude and frequency ac voltage; to provide an improved, inexpensive and adaptable method and apparatus for generating drive signals for an inverter circuit for converting dc voltage to three phase variable amplitude and frequency ac voltage wherein times are written into a writable memory and then used to access firing patterns corresponding to desired voltage levels of the ac voltage to be produced; and, to provide an improved, inexpensive and adaptable method and apparatus for generating drive signals for an inverter circuit for converting dc voltage to three phase variable amplitude and frequency ac voltage wherein times determined from one or more angle tables are used to access firing signal patterns used to control an inverter circuit.

Other objects and advantages of the invention will be apparent from the following description, the accompanying drawings and the appended claims.

BRIEF DESCRIPTION OF THE DRAWINGS

FIGS. 3-10 are the firing signal pattern tables utilized in the working embodiment of FIG. 2; and FIGS. 11-19 are the angle tables utilized in the working embodiment of FIG. 2.

DETAILED DESCRIPTION OF THE PRESENT INVENTION

Figures 1, 2:
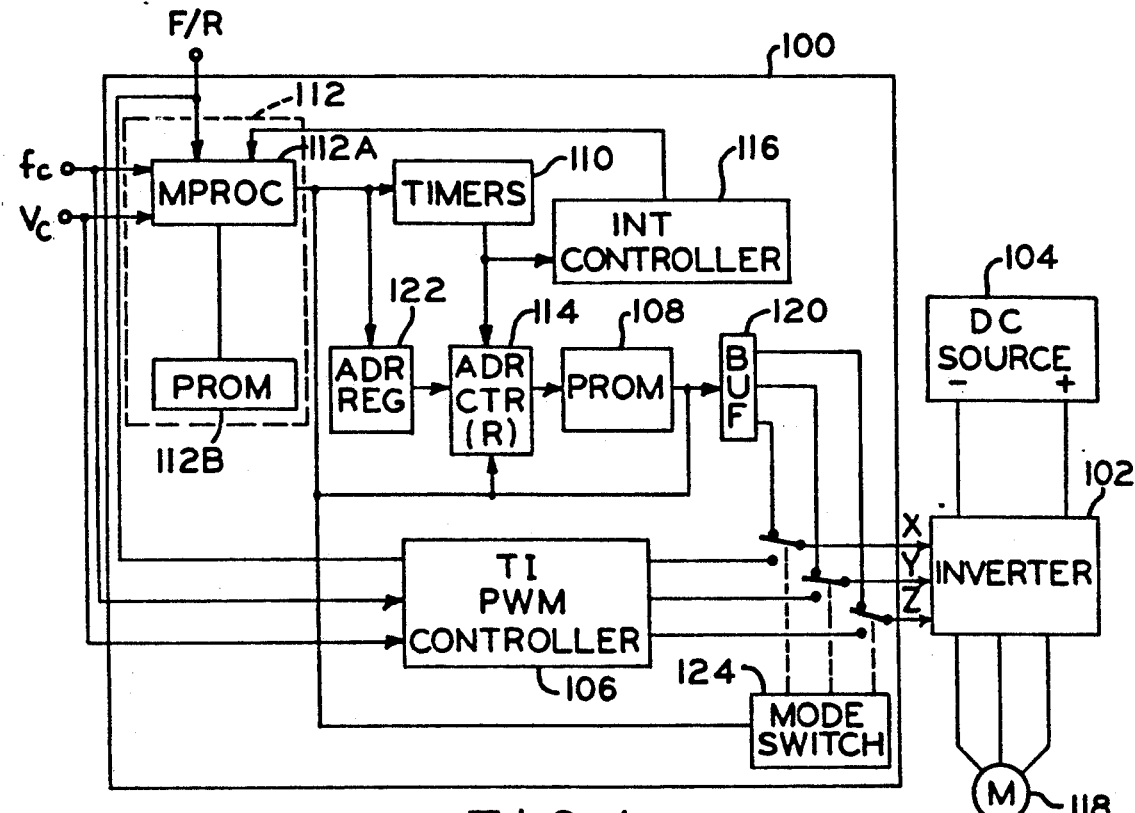
FIG. 1 is a schematic block diagram of an inverter control circuit constructed and operable in accordance with the present invention.
FIG. 2 is a table of the pattern and angle table selections for a working embodiment of an inverter control circuit of the present invention.

Reference will now be made to the drawings wherein FIG. 1 illustrates in schematic block diagram form an inverter control circuit constructed and operable in accordance with the present invention. While the invention of the present application can be used for inverter control throughout the entire operating range of an inverter, it will be described with reference to a working embodiment which operates in conjunction with a triangle interception PWM controller. For ease of description and understanding, the illustrated embodiment of the present invention can be thought of as operating in the motor drive of previously referenced U.S. Pat. No. 4,047,083 and taking the place of all but the triangle interception PWM portion of the waveform generator of the referenced patent. The switch over between triangle interception PWM control and the control of the invention of the present application is performed by processor means of the present invention as will become apparent.

As illustrated in FIG. 1, an inverter control circuit 100 generates drive signals X, Y, Z for an inverter circuit 102 which converts dc voltage from a dc source 104 to three phase variable amplitude and frequency ac voltage. The inverter control circuit 100 includes a triangle interception (TI) PWM controller 106 operable in accordance with the teachings of the referenced patent. The remainder of the inverter control circuit 100 comprises first memory means taking the form of a programmable read only memory (PROM) 108 for storing firing pattern signals defining on/off status of switching devices making up the inverter circuit 102. The firing pattern signals are preferably stored in pattern tables as shown in FIGS. 3-10.

Writable timing circuit means comprising six (6) writable timer circuits 110 in the preferred embodiment provide for addressing the PROM 108 to read the firing pattern signals from the PROM 108. Processor means 112 comprising a microprocessor 112A, an 80186 microprocessor in the preferred embodiment, writes times into the writable timer circuits 110 for controlling the voltage level and frequency of the three phase ac voltage generated by the inverter 102. The writable timer circuits 110 make the frequency of the signal used to read the PROM 108 substantially continuously variable under the control of the microprocessor 112A.

The writable timer circuits 110 use the times received from the microprocessor 112A to step an address counter 114, output signals from which are used to address the PROM 108. In the preferred embodiment of the present invention, the writable timer circuits 110 are made up of two 8254 timer chips which each include three (3) timers such that a total of six (6) timers are available for inverter control. Of course, any reasonable number of timers can be used as appropriate for a given application. As each of the timer circuits 110 time out, a count pulse is delivered to the address counter 114 to step the output signal of the address counter 114 and thereby advance the addressed position within the PROM 108. As the address of the PROM 108 is stepped, the outputs of the PROM 108 sequence through the firing pattern signals contained within a selected pattern table.

Count pulses from the timer circuits 110 are also passed to interrupt control means comprising an interrupt controller 116, an 8259 integrated circuit chip in the preferred embodiment. The interrupt controller 116 signals the microprocessor 112A of the time out of each of the timer circuits 110 such that the microprocessor can maintain at least one of the timer circuits written ahead to ensure proper operation and sequencing of the PROM 108 output signals. Dependent upon the frequency of the ac voltage being produced by the inverter 102 which, for example defines the operating speed of a motor 118 connected to the inverter 102, in the preferred embodiment the microprocessor 112A will write times into the timer circuits 110 up to six (6) milliseconds ahead of the currently required outputs from the PROM 108. The output signals from the PROM 108 are passed through a buffer circuit 120 to the inverter 102.

The microprocessor 112A also selects the pattern table within the PROM 108 which is to be addressed by signals from the address counter 114. For pattern selection, either initial pattern selection or the next pattern selection when the patterns are to be changed, the microprocessor 112A loads the beginning address of the selected pattern table into an address register 122 the contents of which are then loaded into the address counter 114 either by the microprocessor 112A for an initial pattern selection or by an output signal from the PROM 108 as will become apparent for a pattern repeat or selection of a new pattern table.

In the preferred embodiment, the processor means 112 further comprises second memory means taking the form of a programmable read only memory (PROM) 112B for storing angle tables defining transition times of the inverter control signals, i.e. the output signals read from the PROM 108. The tables stored in the PROM 112B are shown in FIGS. 11–19 and are called angle tables because the transition times for the inverter control signals are stored in terms of pulse width angles, i.e. angles at which the transitions are to take place. Thus, the microprocessor 112A in response to the required frequency for the ac voltage to be produced uses the angle tables to determine the signal transition times which it then writes into the writable timing circuits 110. At least one angle table is included for each of the pattern tables with the angle table/pattern table combinations resulting in control of the inverter circuit 102 to generate the required ac voltage. See FIG. 2 for the correlation of the angle tables in FIGS. 11–19 with the pattern tables in FIGS. 3–10.

The microprocessor 112A receives a forward-/reverse (F/R) signal, a frequency signal $F_c$ which is the required frequency of the ac voltage, and a voltage level signal $V_c$ which is the required voltage level of the ac voltage. Based on the F/R and $V_c$ signals, the microprocessor 112A determines the pattern table and angle table, if more than one angle table corresponds to the pattern table, to be used. The $V_c$ signal in combination with the known voltage level of the dc source 104 defines the percentage of the maximum 100% ac voltage level which is possible for the inverter 102 to generate using a square wave control signal for the inverter 102. In the preferred and illustrated embodiment of the present invention, if the percentage of the maximum ac voltage level required by the V signal is equal to or less than 77.7%, control signals for the inverter 102 are generated by the TI PWM controller 106. For control by the TI PWM controller 106, the microprocessor 112A operates the mode switch 124 to connect output signals from the TI PWM controller 106 to the X, Y, Z terminals of the inverter 102. For percentages greater than 77.7%, the microprocessor 112A operates the mode switch 124 to connect output signals from the buffer circuit 120 to the X, Y, Z terminals of the inverter 102.

Referring to the pattern tables shown in FIGS. 3–10, the binary digits are used for control functions of the present invention with transitions being made at the designate angles. The three rightmost binary digits are the X, Y, Z signals which are used to control the inverter circuit 102. A "1" indicates that the corresponding inverter device (whether a GTO, a power transistor, a thyristor or other appropriate device) which is connected to the +side of the dc source 104 is to be fired or made conductive and the corresponding inverter device connected to the −side of the dc source 104 is to be turned off or made nonconductive. Conversely, a "0" indicates that the corresponding inverter control device which is connected to the −side of the dc source 104 is to be fired or made conductive and the corresponding inverter device connected to the +side of the dc source is to be turned off or made nonconductive. The remaining five (5) binary digits are used to control sequencing within the inverter control circuit 100 which could be controlled in any one of a variety of ways and hence will not be described further herein. However, the fifth bit from the right of the binary digits is used to control the reading of both repeated firing patterns and new firing patterns when changes are to be made from one firing pattern to another.

As will be noted from a review of the firing patterns shown in FIGS. 3–10, the fifth bit from the right is normally "0" but is changed to a "1" for the pattern table entries labeled "table end". The "1" bit is used to control the address counter 122 shown in FIG. 1. When the table entry labeled "table end" is read from the PROM 108, the "1" bit drives the reset (R) input of the address counter 114 such that the contents of the address register 122 is loaded into the address counter 114. If a pattern table is to be repeated, the contents of the address register 122 which was originally set by the microprocessor 112A is left undisturbed. Accordingly, the starting address of the pattern table which was just read from the PROM 108 is once again loaded into the address counter 114 and the table readout begins again under the control of the microprocessor 112A via the timer circuits 110 as described. On the other hand, if a new pattern table is to be read from the PROM 108, the starting address of the new table is loaded into the address register 122 prior to the end of the pattern table currently being read from the PROM 108.

The inverter control signals located at the "table end" entries of the pattern tables are appropriate for a smooth transition to the beginning of either the table from which they are read or any other of the pattern tables such that smooth transitions are automatically performed by the inverter control of the present invention. While not provided for in the preferred and illustrated embodiment of the invention of the present application, it is possible to provide transitions at any 60° point in the pattern. Accordingly, the fourth binary digit from the right, which can be observed as always being a "0" is provided to indicate the 60° points in the patterns for switching within patterns or synchronization purposes (30° for the square wave pattern tables P1000F_30 and P1000R_30).

The method of the present invention for generating drive signals for an inverter circuit for converting dc voltage to three phase variable amplitude and frequency ac voltage comprises initially storing firing pattern signals defining on/off status of switching devices making up the inverter circuit 102. The firing pattern signals are then read in accordance with writable read times to access the firing pattern signals for control of the inverter circuit 102. Finally, the read times to control the voltage level and frequency of the three phase ac voltage generated by the inverter circuit 102 are written. The read times may be written into writable timing circuits 110. The step of storing firing pattern signals may comprise storing tables of firing pattern signals corresponding to voltage levels of the three phase ac voltage to be generated by the inverter circuit 102 with the method further comprising selecting among the tables as a function of the three phase ac voltage to be generated by the inverter.

It is observed that the invention of the present application provides for all control of the inverter circuit 102 at desired or required voltage levels above approximately 77.7% of the ac voltage to be produced. Transition from PWM control of the inverter to square wave control is smoothly handled in accordance with the normal operation of the invention such that no special transition arrangements need to be made as in the prior art. While a large number of pattern tables and angle tables were constructed for implementing the inverter control of the present invention, a working a preferred embodiment of the invention was constructed using the pattern tables and angle tables shown in FIGS. 3-19. Since an effectively infinite number of such tables are possible and can be readily made by those of ordinary skill in the art and since other tables which were constructed resulted in less desirable operation of the inverter control circuit of the present invention, the numerous additional tables are not disclosed herein.

The following is a program listing in assembly language of the 80186 microprocessor which was used in a working embodiment of the present invention for controlling the inverter control 100 as described above:

```
$EJECT          "                                              ~
;****************************************************************
TIMER_COUNT_CALC       PROC    NEAR
;****************************************************************

; The value written to the TIMERS = (Degrees stored in table/SPEED_FB).
; A lower limit of SPEED_FB is checked so that overflow can be avoided
; the value of the timer counter is calculated, saved and updated MOV     BX,TABLE_NO_USED
            SHL     BX,1                        ; *2 for word
            MOV     SI,CS:TABLE_INDEX[BX]       ; Get the starting address MOV     BX,TABLE_POINTER            ; Pointer to the degree table
            MOV     AX,WORD PTR CS:TABLE_INDEX[SI][BX]  ; low word
            MOV     DX,WORD PTR CS:TABLE_INDEX[SI][BX+2]; high word
            ADD     AX,HALF_FREQ_CMND
            ADC     DX,0
            MOV     CX,FREQ_CMND                ; Frequncy CMP     CX,WORD PTR CS:TABLE_INDEX[SI+2] ; Check for min freq limit
            JA      FREQ_HIGH                   ;
            MOV     CX,WORD PTR CS:TABLE_INDEX[SI+2] ; clamp to min freq
FREQ_HIGH:                                      ; Frequncy above min
            DIV     CX                          ;
            MOV     TIMER_COUNT,AX              ; Set the RAM image MOV     CX,BX                       ; save pointer to table
            MOV     BX,TIMER_POINTER            ; pointer to timer
            MOV     DI,BX
            MOV     AL,CS:TIMER_MODE_TAB[BX]    ; get the mode command
            SHL     BX,1                        ; word
            MOV     DX,CS:TIMER_MODE_ADD[BX]    ; get the mode address
            OUT     DX,AL                       ; output
```

```
                    MOV     DX,CS:TIMER_COUNTER[BX]     ; get timer counter address
                    MOV     AX,TIMER_COUNT              ; count
                    OUT     DX,AL                       ; output
                    MOV     AL,AH                       ; msb of count
                    OUT     DX,AL                       ; output MOV     AX,DI
                    INC     AX                          ; point to the next timer
                    CMP     AX,6
                    JB      NO_TIMER_POINTER_RESET
                    XOR     AX,AX                       ; reset to 0
NO_TIMER_POINTER_RESET:
                    MOV     TIMER_POINTER,AX            ; save the pointer to timer
                    MOV     BX,CX                       ; restore pointer to table
                    ADD     BX,4                        ; Update (doubleword)
                    CMP     BX,CS:TABLE_INDEX[SI]       ; Has it reached end of table?
                    JB      NO_RESET
                    MOV     BX,8                        ; If so set to start
                    CMP     TABLE_BEING_CHANGED,TRUE
                    JNE     NO_RESET
                    MOV     DX,TABLE_TO_BE_USED
                    MOV     TABLE_NO_USED,DX            ; update the table no
                    MOV     TABLE_BEING_CHANGED,FALSE
                    CMP     DX,TABLE_NO_DESIRED         ; is it the table desired?
                    JNE     NO_RESET
                    MOV     TABLE_CHANGE_FLAG,FALSE     ; if so clear the flag
NO_RESET:
                    MOV     TABLE_POINTER,BX            ; Update pointer CMP     TABLE_CHANGE_FLAG,TRUE      ; a new table needed?
                    JNE     NO_CHANGE
                    CMP     BX,28H                      ; beginning of table?
                    JNE     NO_CHANGE ;Change the PROM look up table addresses and the TABLE_NO_USED
                    MOV     BX,TABLE_NO_DESIRED
                    MOV     TABLE_TO_BE_USED,BX         ; Update the # to be used
                    SHL     BX,1                        ; *2 for word
                    MOV     SI,CS:TABLE_INDEX[BX]       ; Get the starting address
                    CMP     SPEED_FB,0                  ; in PROM firing table
                    JL      REVERSE_DIR1
                    MOV     AX,WORD PTR CS:TABLE_INDEX[SI+4] ; forward
                    JMP     SHORT DIR_SET1
REVERSE_DIR1:
                    MOV     AX,WORD PTR CS:TABLE_INDEX[SI+6] ; reverse
DIR_SET1:
                    MOV     DX,TABLOWR
                    OUT     DX,AL                       ; OFFSET
                    MOV     AL,AH                       ;
                    MOV     DX,TABHIWR
                    OUT     DX,AL                       ; table starting point. this
                                                        ; starts the firing
                    MOV     TABLE_BEING_CHANGED,TRUE    ; set flag
NO_CHANGE:

RET

TIMER_COUNT_CALC    ENDP
```

$EJECT
;**********************************************************
TIMER_COUNT_INIT        PROC    NEAR
;**********************************************************
; The value written to the TIMERS = (Degrees stored in table/SPEED_FB).
; A lower limit of SPEED_FB is checked so that overflow can be avoided
; Three timers 0,1,2 are initialized. The code is similar to the one in
; timer_count_calc
```
                XOR     AX,AX
                MOV     TOTAL_TIME_COUNT,AX
                MOV     DI,AX
                MOV     TIME_EXPIRED_POINTER,AL MOV     BX,TABLE_NO_USED
                SHL     BX,1                    ; *2 for word
                MOV     SI,CS:TABLE_INDEX[BX]   ; Get the starting address MOV     BX,START_OFFSET         ; table pointer = 8 (size to
                                                ; offset).
                MOV     AX,WORD PTR CS:TABLE_INDEX[SI][BX]; low word
                MOV     DX,WORD PTR CS:TABLE_INDEX[SI][BX+2]; high word
                ADD     AX,HALF_FREQ_CMND
                ADC     DX,0
                MOV     CX,FREQ_CMND            ; Frequncy CMP     CX,WORD PTR CS:TABLE_INDEX[SI+2] ; Check for min freq limit
                JA      FREQ_HIGH_INIT          ;
                MOV     CX,WORD PTR CS:TABLE_INDEX[SI+2] ; clamp to min freq
FREQ_HIGH_INIT:                                 ; Frequncy above min
                DIV     CX                      ;
                MOV     TIMER_COUNT,AX          ; Set the RAM image
                MOV     TEMPA0_COUNT,AX         ; save for timer a 0
; this time is not considered towards total_time_count since this timer will
; have timed out when the first interrupt happens
                ADD     BX,4                    ; Update (doubleword)

MOV     AX,WORD PTR CS:TABLE_INDEX[SI][BX]; low word
                MOV     DX,WORD PTR CS:TABLE_INDEX[SI][BX+2]; high word
                DIV     CX                      ;
                MOV     TIMER_COUNT,AX          ; Set the RAM image
                MOV     TEMPA1_COUNT,AX         ; save for timer a 1
                SHR     AX,3H           ;time_count_table(time_pending_pointer)
                MOV     TIME_COUNT_TABLE[DI],AX ; timer_count/8
                ADD     AX,TOTAL_TIME_COUNT     ; total_time_count =
                MOV     TOTAL_TIME_COUNT,AX ; total_time_count + timer_count/8
                ADD     DI,2                    ; word
                ADD     BX,4                    ; Update (doubleword)
                CMP     AX,PAT_TIME_LIMIT       ; has total time written
                JA      TIMER_COUNTS_CALCULATED1 ; reached a limit ?

MOV     AX,WORD PTR CS:TABLE_INDEX[SI][BX]; low word
                MOV     DX,WORD PTR CS:TABLE_INDEX[SI][BX+2]; high word
                DIV     CX                      ;
                MOV     TIMER_COUNT,AX          ; Set the RAM image
                MOV     TEMPA2_COUNT,AX         ; save for timer a 2
                SHR     AX,3H           ;time_count_table(time_pending_pointer)
                MOV     TIME_COUNT_TABLE[DI],AX ; timer_count/8
                ADD     AX,TOTAL_TIME_COUNT     ; total_time_count =
                MOV     TOTAL_TIME_COUNT,AX ; total_time_count + timer_count/8
                ADD     DI,2                    ; word
                ADD     BX,4                    ; Update (doubleword)
                CMP     AX,PAT_TIME_LIMIT       ; has total time written
TIMER_COUNTS_CALCULATED1: ; since cannot take this long jump
                JA      TIMER_COUNTS_CALCULATED ; reached a limit ?
```

```
        MOV     AX,WORD PTR CS:TABLE_INDEX[SI][BX]; low word
        MOV     DX,WORD PTR CS:TABLE_INDEX[SI][BX+2]; high word
        DIV     CX                      ;
        MOV     TIMER_COUNT,AX          ; Set the RAM image
        MOV     TEMPB0_COUNT,AX         ; save for timer b 0
        SHR     AX,3H           ;time_count_table(time_pending_pointer)
        MOV     TIME_COUNT_TABLE[DI],AX ; timer_count/8
        ADD     AX,TOTAL_TIME_COUNT     ; total_time_count =
        MOV     TOTAL_TIME_COUNT,AX ; total_time_count + timer_count/8
        ADD     DI,2                    ; word
        ADD     BX,4                    ; Update (doubleword)
        CMP     AX,PAT_TIME_LIMIT       ; has total time written
        JA      TIMER_COUNTS_CALCULATED ; reached a limit ?

MOV     AX,WORD PTR CS:TABLE_INDEX[SI][BX]; low word
        MOV     DX,WORD PTR CS:TABLE_INDEX[SI][BX+2]; high word
        DIV     CX                      ;
        MOV     TIMER_COUNT,AX          ; Set the RAM image
        MOV     TEMPB1_COUNT,AX         ; save for timer b 1
        SHR     AX,3H           ;time_count_table(time_pending_pointer)
        MOV     TIME_COUNT_TABLE[DI],AX ; timer_count/8
        ADD     AX,TOTAL_TIME_COUNT     ; total_time_count =
        MOV     TOTAL_TIME_COUNT,AX ; total_time_count + timer_count/8
        ADD     DI,2                    ; word
        ADD     BX,4                    ; Update (doubleword)
        CMP     AX,PAT_TIME_LIMIT       ; has total time written
        JA      TIMER_COUNTS_CALCULATED ; reached a limit ?

MOV     AX,WORD PTR CS:TABLE_INDEX[SI][BX]; low word
        MOV     DX,WORD PTR CS:TABLE_INDEX[SI][BX+2]; high word
        DIV     CX                      ;
        MOV     TIMER_COUNT,AX          ; Set the RAM image
        MOV     TEMPB2_COUNT,AX         ; save for timer b 2
        SHR     AX,3H           ;time_count_table(time_pending_pointer)
        MOV     TIME_COUNT_TABLE[DI],AX ; timer_count/8
        ADD     AX,TOTAL_TIME_COUNT     ; total_time_count =
        MOV     TOTAL_TIME_COUNT,AX ; total_time_count + timer_count/8
        ADD     DI,2                    ; word
        ADD     BX,4                    ; Update (doubleword)

TIMER_COUNTS_CALCULATED:
        CMP     BX,CS:TABLE_INDEX[SI]   ; Has it reached end of table?
        JB      NO_RESET_INIT
        MOV     BX,8                    ; If so set to start
NO_RESET_INIT:
        MOV     TABLE_POINTER,BX        ; Update pointer
        MOV     CX,DI
        SHR     CX,1                    ; convert to pointer index
        MOV     TIME_PENDING_POINTER,CL ; for yintrupt
        CLI                     ;disable so that all the timers will
                                ; be written to & pointers initialized
                                ; before timer isrs are processed
                                ; cx contains the info about the number
                                ; of timers to write to
        MOV     DX,OUTINT_OCW2          ; 8259
        MOV     AL,11000110B
        OUT     DX,AL                   ; timer a 0 to high priority
        MOV     DX,TIMERA_MODE
        MOV     AL,COUNTERA0_MODE0      ; get the mode command
        OUT     DX,AL                   ; output
        MOV     DX,TIMERA0_COUNTER      ; timer a 0 address
        MOV     AX,TEMPA0_COUNT         ; ax = timer a 0 count
```

```
        OUT     DX,AL                       ; output lsb
        MOV     AL,AH                       ; msb of count
        OUT     DX,AL                       ; output MOV     DX,TIMERA_MODE
        MOV     AL,COUNTERA1_MODE0          ; get the mode command
        OUT     DX,AL                       ; output
        MOV     DX,TIMERA1_COUNTER          ; timer a 1 address
        MOV     AX,TEMPA1_COUNT             ; ax = timer a 1 count
        OUT     DX,AL                       ; output lsb
        MOV     AL,AH                       ; msb of count
        OUT     DX,AL                       ; output
        MOV     PAT_INT_COUNT,4             ; four counters left
        MOV     TIMER_POINTER,2             ; point to timer 2
        DEC     CX                          ; check if this is the last
        JZ      TIMERS_INITIALIZED          ; timer calculated MOV     DX,TIMERA_MODE
        MOV     AL,COUNTERA2_MODE0          ; get the mode command
        OUT     DX,AL                       ; output
        MOV     DX,TIMERA2_COUNTER          ; timer a 2 address
        MOV     AX,TEMPA2_COUNT             ; ax = timer a 2 count
        OUT     DX,AL                       ; output lsb
        MOV     AL,AH                       ; msb of count
        OUT     DX,AL                       ; output
        MOV     PAT_INT_COUNT,3             ; three counters left
        MOV     TIMER_POINTER,3             ; point to timer 3
        DEC     CX                          ; check if this is the last
        JZ      TIMERS_INITIALIZED          ; timer calculated MOV     DX,TIMERB_MODE
        MOV     AL,COUNTERB0_MODE0          ; get the mode command
        OUT     DX,AL                       ; output
        MOV     DX,TIMERB0_COUNTER          ; timer b 0 address
        MOV     AX,TEMPB0_COUNT             ; ax = timer b 0 count
        OUT     DX,AL                       ; output lsb
        MOV     AL,AH                       ; msb of count
        OUT     DX,AL                       ; output
        MOV     PAT_INT_COUNT,2             ; two counters left
        MOV     TIMER_POINTER,4             ; point to timer 4
        DEC     CX                          ; check if this is the last
        JZ      TIMERS_INITIALIZED          ; timer calculated
        MOV     DX,TIMERB_MODE
        MOV     AL,COUNTERA1_MODE0          ; get the mode command
        OUT     DX,AL                       ; output
        MOV     DX,TIMERB1_COUNTER          ; timer b 1 address
        MOV     AX,TEMPB1_COUNT             ; ax = timer b 1 count
        OUT     DX,AL                       ; output lsb
        MOV     AL,AH                       ; msb of count
        OUT     DX,AL                       ; output
        MOV     PAT_INT_COUNT,1             ; one counters left
        MOV     TIMER_POINTER,5             ; point to timer 5
        DEC     CX                          ; check if this is the last
        JZ      TIMERS_INITIALIZED          ; timer calculated MOV     DX,TIMERB_MODE
        MOV     AL,COUNTERA2_MODE0          ; get the mode command
        OUT     DX,AL                       ; output
        MOV     DX,TIMERB2_COUNTER          ; timer b 2 address
        MOV     AX,TEMPB2_COUNT             ; ax = timer b 2 count
        OUT     DX,AL                       ; output lsb
        MOV     AL,AH                       ; msb of count
```

```
                OUT     DX,AL                   ; output
                MOV     PAT_INT_COUNT,0         ; zero counters left
                MOV     TIMER_POINTER,0         ; point to timer 0

TIMERS_INITIALIZED:
                MOV     PAT_INT_INSERVICE,FALSE ; no int in service
                MOV     PAT_INT_ENABLE,TRUE     ; start processing pattern interrupts
                STI

RET

TIMER_COUNT_INIT        ENDP $EJECT
;****************************************************************
PULSE_CONTROL   PROC    NEAR
;****************************************************************
;
                PUSH    BP              ;SAVE BP FOR BP ADDRESSING MODE
                MOV     BP,SP           ;PRESENT SP IN BP REGISTER
;
;----------------------------------------------------------------
; If the PULSE_MODE command is set to zero it indicates that the square
; wave control hardware is not desired. Set the gate array control
; register to employ the pwm control and disable interrupts from the
; counters driving the EPROM firing table.
;----------------------------------------------------------------
;       PWM: PULSE_MODE = 0,    SQUARE WAVE: PULSE_MODE = 1
                MOV     AL,PULSE_MODE   ;LOAD PULSE_MODE COMMAND
                CMP     AL,00H          ; If ZERO then sine/triangle control
                JNE     PATTERN_CONTROL ; else TABLE look up & control
;
                CLI                     ;disable so that prtgate interrupt
                                        ;does not modify gate_control in the
                                        ;middle of a change
                MOV     AX,GATE_CONTROL
                AND     AX,1011111111B  ;if command is zero then turn on the
                OUT     STD_CELL_CRTL,AX ; pwm control in the gate array
                MOV     GATE_CONTROL,AX ;  AND TO CONTROL RAM IMAGE
                MOV     AX,0000H        ; set proper direct bits
                OUT     STD_CELL_DIRECT,AX
                STI
;
                MOV     DX,TIMERA_MODE
                MOV     AL,COUNTERA0_MODE0      ; just write modes to
                OUT     DX,AL                   ; all three counters to
                MOV     AL,COUNTERA1_MODE0      ; hang them up and to
                OUT     DX,AL                   ; prevent them from timing
                MOV     AL,COUNTERA2_MODE0      ; out
                OUT     DX,AL MOV     DX,TIMERB_MODE
                MOV     AL,COUNTERB0_MODE0      ; just write modes to
                OUT     DX,AL                   ; all three counters to
                MOV     AL,COUNTERB1_MODE0      ; hang them up and to
                OUT     DX,AL                   ; prevent them from timing
                MOV     AL,COUNTERB2_MODE0      ; out
                OUT     DX,AL MOV     PAT_INT_ENABLE,FALSE    ; stop processing pattern interrupts
;
                POP     BP              ;POP BP
                RET     2               ; AND RETURN
```

$eject

PATTERN_CONTROL:
;initialize the PROM look up table addresses and the TABLE_NO_USED

```
            MOV     DX,TIMERA_MODE
            MOV     AL,COUNTERA0_MODE0      ; just write modes to
            OUT     DX,AL                   ; all three counters to
            MOV     AL,COUNTERA1_MODE0      ; hang them up and to
            OUT     DX,AL                   ; prevent them from timing
            MOV     AL,COUNTERA2_MODE0      ; out
            OUT     DX,AL MOV     DX,TIMERB_MODE
            MOV     AL,COUNTERB0_MODE0      ; just write modes to
            OUT     DX,AL                   ; all three counters to
            MOV     AL,COUNTERB1_MODE0      ; hang them up and to
            OUT     DX,AL                   ; prevent them from timing
            MOV     AL,COUNTERB2_MODE0      ; out
            OUT     DX,AL MOV     BX,TABLE_NO_DESIRED
            MOV     TABLE_TO_BE_USED,BX
            MOV     TABLE_NO_USED,BX        ; Update the number in use
            MOV     TABLE_CHANGE_FLAG,FALSE ; set flag
            MOV     TABLE_BEING_CHANGED,FALSE ; set flag
            SHL     BX,1                    ; *2 for word
            MOV     SI,CS:TABLE_INDEX[BX]   ; Get the starting address
            CMP     SPEED_FB,0              ; in PROM firing table
            JL      REVERSE_DIR2
            MOV     AX,WORD PTR CS:TABLE_INDEX[SI+4] ; forward
            JMP     SHORT DIR_SET2
REVERSE_DIR2:
            MOV     AX,WORD PTR CS:TABLE_INDEX[SI+6] ; reverse
DIR_SET2:

MOV     BX,AX                   ;save for checking later

MOV     DX,TABLOWR
            OUT     DX,AL                   ; OFFSET
            MOV     AL,AH                   ;
            MOV     DX,TABHIWR
            OUT     DX,AL                   ; table starting point. this
                                            ; starts the firing
            MOV     DX,OK_WR
            MOV     AL,OUT_OK
            AND     AL,YTABLD               ; table load
            OUT     DX,AL
            MOV     OUT_OK,AL
            MOV     DX,RMCKWR               ; writing anything
            OUT     DX,AL                   ; produces rom clock
            MOV     DX,ABC_WR               ; writing anything latches
            OUT     DX,AL                   ; abc outputs from prom
            MOV     DX,OK_WR
            OR      AL,NO_YTABLD            ; no more table table load
            OUT     DX,AL
            MOV     OUT_OK,AL MOV     DX,PROM_HIRD
            IN      AL,DX
            MOV     AH,AL                   ;get the msb of actual
                                            ;address the prom is at
            MOV     DX,PROM_LORD
```

```
            IN      AL,DX                       ; get lsb
            CMP     AX,BX
            JE      RIGHT_PLACE MOV     AX,GATE_CONTROL
            AND     AX,11000111118   ;turn off leg enables
            OUT     STD_CELL_CRTL,AX
            MOV     GATE_CONTROL,AX ;set ram image
            PUSH    ES
            ASSUME  ES:DUAL_RAM      ;ASSUME DUAL PORT RAM ACCESS
            MOV     AX,DUAL_RAM      ;LOAD ES REGISTER DP RAM START
            MOV     ES,AX
            OR      DPR_YFAULT_ST,NO_PATTERN_START ; message to x
            MOV     RUN_DRIVE,FALSE ; turn off the drive
            POP     ES
            JMP     SHORT FAULT_RET
RIGHT_PLACE:

CALL    TIMER_COUNT_INIT            ; to load Timer 0

CLI                                 ;disable so that prtgate interrupt
                                                ;does not modify gate_control in the
                                                ;middle of a change
            MOV     AX,GATE_CONTROL ;load control ram image
            OR      AX,01000000008  ;set external select bit
            OUT     STD_CELL_CRTL,AX ;   OPERATION BY WRITING TO GATE ARRAY.
            MOV     GATE_CONTROL,AX ;    AND TO CONTROL RAM IMAGE
            MOV     AX,00E0H         ; set proper direct bits
            OUT     STD_CELL_DIRECT,AX
            STI
FAULT_RET:
;
            POP     BP
            RET     2
PULSE_CONTROL   ENDP

CODE        ENDS
            END
```

Having thus described the of the inverter control method and apparatus of the present invention in detail and by reference to preferred embodiments thereof, it will be apparent that modifications and variations are possible without departing from the scope of the invention defined in the appended claims.

What is claimed is:

1. A control circuit for generating drive signals for an inverter circuit for converting dc voltage to three phase variable amplitude and frequency ac voltage comprising:

memory means for storing firing pattern signals defining on/off status of switching devices making up the inverter circuit;

writable timing circuit means for addressing the memory means to read the firing pattern signals from the memory means;

processor means for writing times into the writable timing circuit means for controlling the voltage level and frequency of the three phase ac voltage generated by the inverter, wherein the frequency of a signal between the writable timing circuit means and an address counter means is substantially continuously variable under the control of the processor means; and interrupt controller means, operatively connected to the writable timing circuit means and the processor means, for generating interrupt of the processor means upon time outs of the writable timing circuit means such that the processor means maintains at least one of the timing circuit means written ahead.

2. The control circuit of claim 1 wherein the firing pattern signals are stored in firing pattern tables and the processor means further provides for selecting among the pattern tables.

3. The control circuit of claim 2 wherein the processor means further comprises angle table storage means for storing angle tables defining transition times for sequencing between consecutively read ones of the firing pattern signals within corresponding firing signal pattern tables, the transition times being stored in terms of pulse width angles of the transition times and the processor means using the angle tables to determine times written into the writable timing circuit means.

4. The control circuit of claim 3 wherein the angle tables include at least one angle table for each pattern table.

5. A control circuit for generating drive signals for an inverter circuit which converts dc voltage to three phase variable amplitude and frequency ac voltage comprising:

first memory means for storing firing pattern tables including inverter control signals defining on/off status of switching devices making up the inverter circuit:

writable timing circuit means for addressing the first memory means to read the firing pattern tables stored within the first memory means in accordance with times written into the writable timing circuit means;

processor means for selecting pattern tables within the first memory means in response to a desired voltage level for the three phase ac voltage generated by the inverter and for writing times into the writable timing circuit means in response to a desired frequency for a three phase ac voltage generated by the inverter wherein the frequency of a signal between the writable timing circuit means and an address counter means is substantially continuously variable under the control of the processor means; and interrupt controller means, operatively connected to the writable timing circuit means and the processor means, for generating interrupts of the processor means upon time outs of the writable timer means such that the processor means maintains up to six milliseconds of the times written ahead into the writable timing circuit means.

6. The control circuit of claim 5 wherein the processor means comprises second memory means for storing angle tables defining transition times of the inverter control signals in terms of pulse width angles for the transition times, the processor means using the angle tables for determining times written into the writable timing circuit means.

7. The control circuit of claim 6 wherein the angle tables include at least one angle table for each pattern table.

8. The control circuit of claim 7 wherein processor means further provides for selecting among the angle tables to further define the voltage level of the three phase ac voltage generated by the inverter circuit.

9. A method for generating drive signals for an inverter circuit for converting dc voltage to three phase variable amplitude and frequency ac voltage comprising the steps of:

storing firing pattern signals defining on/off status of switching devices making up the inverter circuit;

reading the firing pattern signals in accordance with writable read times to access the firing pattern signals for control of the inverter circuit;

writing the read times to control the voltage level and frequency of the three phase ac voltage generated by the inverter into a writable timing circuit means wherein the frequency of a signal between the writable timing circuit means and address counter means is substantially continuous variable under the control of a processor means; and generating interrupts upon time outs of the writable circuit means.

10. The method of claim 9 wherein the step of storing firing pattern signals comprises storing tables of firing pattern signals corresponding to voltage levels of the three phase ac voltage generated by the inverter circuit and the method further comprises selecting among the tables as a function of the three phase ac voltage to be generated by the inverter.

11. The method of claim 10 further comprising the step of storing angle tables defining transition times for sequencing between consecutively read ones of the firing pattern signals within corresponding firing signal pattern tables, the transition times being stored in terms of pulse width angles of the transition times, the method further comprising the step of determining the read times in accordance with the angle tables.

12. The method of claim 11 wherein said angle tables include at least one angle for each pattern table.

13. The method of claim 12 further comprising the step of selecting an angle table to define the voltage level of the three phase ac voltage.

14. An inverter control circuit comprising:

a triangle interception PWM controller means operatively connected to the inverter;

first memory means for storing firing pattern signals defining on/off status of switching devices contained in an inverter circuit;

writable timing circuit means for addressing the first memory means for reading the firing pattern signals from the first memory means;

processor means for writing times into the writable timing circuit means and for controlling the voltage level and frequencies of a three phase AC voltage generated by the inverter wherein the frequency of a signal between the writable circuits and an address counter mean is substantially continuously variable under the control of the processor means; and interrupt controller means, interconnected between the writable timing circuit means and the processor mean, for generating interrupts of the processor means upon time outs of the writable timing circuit means, the interrupt controller means allows the processor means to maintain a defined portion of the times written ahead into the writable timing means.

15. The inverter control circuit of claim 14 wherein the firing pattern signals are stored in firing pattern tables and the processor means further provides for selecting among the pattern tables.

16. The inverter control circuit of claim 14 wherein the processor means further comprises:

angle table storage means for storing angle tables defining transition times for sequencing between consecutively read outs of the firing pattern signals within corresponding firing signal pattern tables, the transition times being stored in terms of pulse width angles of the transition times and the processor means using the angle tables to determine times written into the writable timing circuit means.

17. The inverter control circuit of claim 14 wherein the defined portion is up to six milliseconds.

18. The method of claim 9 further comprising the step of:

maintaining at least one of the writable timing circuit means written ahead.

* * * * *